Jan. 8, 1946.   G. N. HANSON ET AL   2,392,381
AUTOMATIC CONTROLLING MEANS FOR AIRCRAFT
Filed May 15, 1942   3 Sheets-Sheet 1

INVENTORS:
GERALD N. HANSON
PERCY HALPERT
CARL A. FRISCHE
BY
their ATTORNEY

INVENTORS:
GERALD N. HANSON
PERCY HALPERT
CARL A. FRISCHE
BY
ATTORNEY.

Patented Jan. 8, 1946

2,392,381

UNITED STATES PATENT OFFICE 2,392,381

AUTOMATIC CONTROLLING MEANS FOR AIRCRAFT

Gerald N. Hanson, Allendale, N. J., and Percy Halpert, Kew Gardens, and Carl A. Frische, Great Neck, N. Y., assignors to Sperry Gyroscope Company, Inc., Brooklyn, N. Y., a corporation of New York Application May 15, 1942, Serial No. 443,146

2 Claims. (Cl. 244—75)

This invention relates to control devices for aircraft. More particularly, the invention is concerned with automatic pilots for positioning an aircraft by means of its elevator, ailerons or rudder.

The primary feature of the present invention is a cable release by which the main cable drum of the automatic pilot may be positively freed from the servo motor by which it is normally driven.

Other objects, features and structural details of the invention will be apparent from the following description when read in connection with the accompanying drawings, wherein Fig. 1 shows a schematic diagram illustrating, in exploded relation, the component parts of a servo motor control unit constructed in accordance with the present invention.

Figure 2:
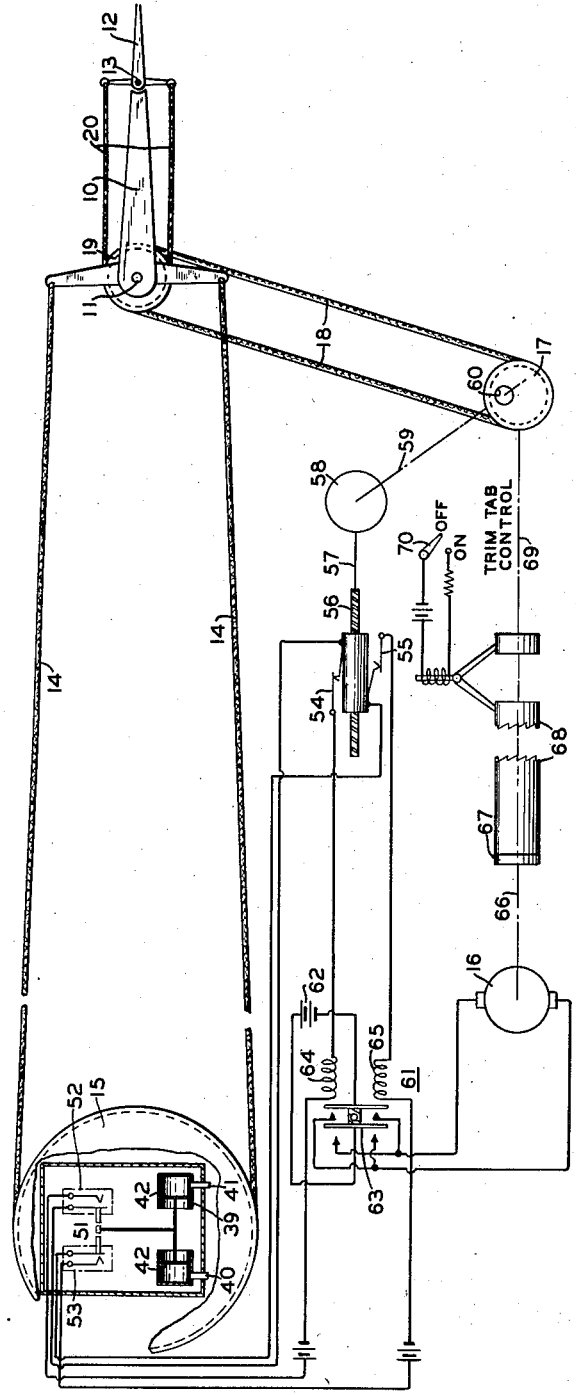
Fig. 2 is a schematic view and wiring diagram of the improved trim tab control of the automatic pilot.

With reference to the drawings and particularly Fig. 2, one of the control surfaces for aircraft, such as the elevator, is shown to include a main surface 10 pivoted at 11 in the tail of the craft and a trim tab or auxiliary surface 12 which is pivoted at 13 on the main surface. The elevator may be moved under control of either the automatic pilot as hereinafter more particularly described, or the human pilot by suitable connecting linkage (not shown). The trim tab is similarly controlled in an independent manner, the manual control for this surface, being of a suitable and well known construction, not being illustrated in the drawings. A cable linkage 14 connects the main surface 10 so that movement is transmitted to the same from the cable drum 15 of the servo motor of the automatic pilot. In accordance with the teaching of the invention, the trim tab 12 is independently positioned by motive means consisting of a reversible motor, indicated at 16, whose movement is transmitted by way of drum 17, cable 18, pulley 19 and linking cables 20 to the same, in a manner hereinafter more particularly described.

Figure 1:
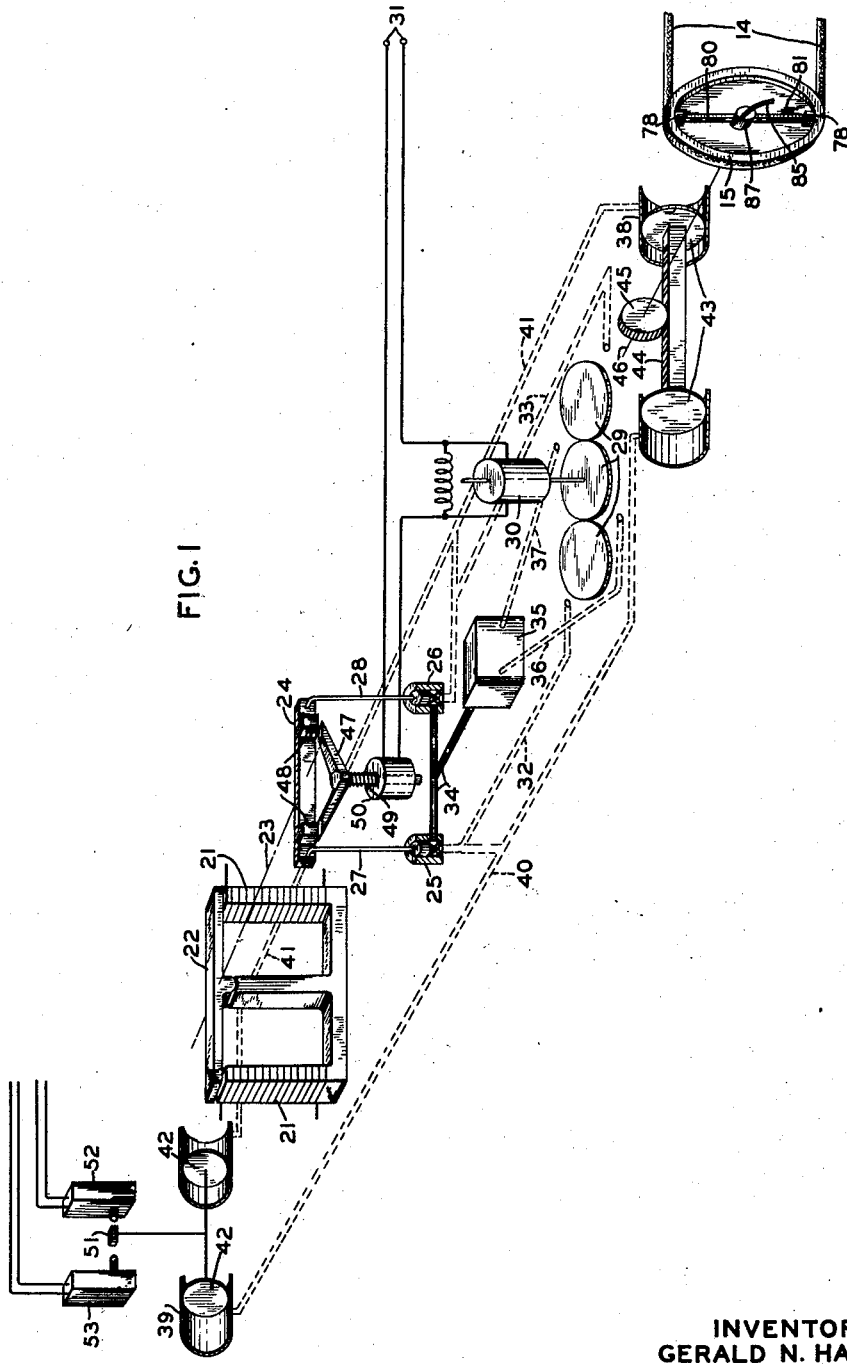

In Fig. 1, the servo unit of the automatic pilot is shown to include a controlling torque motor whose stator windings 21 are fed by an electrical signal from an elevator servo amplifier circuit of the character particularly described in the copending application of George P. Bentley and Carl A. Frische, Serial No. 259,178, filed March 1, 1939. The armature 22 of the controlling magnetic motor is mounted to rock about an axis 23 and position the rocker arm 24 and the respective valves 25 and 26 which are pivotally connected to the arm 24 at opposite ends of the same by means of the valve stems 27 and 28. The servo unit of the automatic pilot also includes, in the present instance, a three gear type hydraulic pump, indicated at 29, which is driven by a motor 30 that is energized from a suitable source of electrical energy, as indicated at 31. As shown, pump 29 delivers oil or other fluid to the respective valves 25 and 26 by way of pipes 32 and 33, the return flow of the fluid to which the valves offer but small resistance in their normal positions being made by way of the common pipe 34, sump 35 and pump intake pipes 36 and 37. The outlet pipes of the pump 29 also communicate with the respective ends of the main servo cylinder 38 and auxiliary servo cylinder 39. Such connection is accomplished as shown in Fig. 1 by the respective pipes 40 and 41. In the present instance, auxiliary cylinder 39 is constructed of smaller size than the main cylinder 38. It will be understood that movement of pistons 43 results from a change in the normally balanced pressure in opposite sides of the main servo cylinder 38 and that such motion is also communicated to the pistons 42 of the auxiliary servo cylinder 39. Control over the servo unit is exercised by the torque motor whose coils or windings 21 are connected across the output of an amplifier circuit which normally applies the same voltage across each coil. The magnetic armature 22 consequently is affected by equal and opposite torque and therefore exerts no force to tend to close either of the valves 25 or 26. When the signal for the torque motor is unbalanced, the armature 22 is rocked and the valves 25 and 26 moved correspondingly which differentially restricts the free flow of fluid from the pump 29 through the valves and sump 35 back to the pump. The pump consequently builds up a pressure to overcome the restriction caused by unbalancing of the valves which results in the controlling movement of the pistons 43 and 42. Piston movement of the main cylinder 38 is communicated directly to drum 15 by way of the piston connecting rack 44, pinion 45 and driving shaft 46. Control of the trim tab movement exerting drum 17 is initiated by means of the auxiliary servo cylinder 39 as hereinafter more particularly described.

When automatic flight control is not required, it is desirable that the pilot be able to effect manual movement of the pistons 43 and 42 without opposition since the rack engaging pinion 45 for pistons 43 is mechanically connected to the craft's cable system. In accordance with the teaching of the present invention such a result is obtained without using an additional oil by-pass by a means for centralizing the differential controlling valves 25 and 26 of the servo unit. As shown in Fig. 1, means are provided in the form of a forked arm 47 whose spread ends engage the undersurface of two spaced blocks 48 rigidly mounted on the rocker arm 24. Engagement of arm 47 with blocks 48 is effected by means of spring 49 which urges the parts into a position to centralize the rocker 24 and valves 25 and 26. The spring 49 is rendered normally ineffective by means of solenoid 50 which is situated in series in the circuit supplying the pump motor 30. The central stem of the forked arm 47 provides an armature for the solenoid 50 which is effective as long as energy is supplied to drive the pump motor to disable the spring 49 and permit the servo motor to respond to signals for automatic flight. When the circuit to the pump motor 30 is opened, the pump ceases functioning and the solenoid 50 is no longer energized, which restores the system to the control of the spring 49 which is then effective to centralize the rocker arm 24 with the valves 25 and 26 in their full open position, the effect of the spring overcoming in a positive manner the torque motor armature to which the arm 24 is directly connected. This permits the fluid to by-pass freely through the control valves as soon as the power to the pump drive motor is removed.

With reference to Fig. 2, the automatic trim regulator is shown controlled from the auxiliary servo cylinder 39. Movement of the connected pistons 42 is transferred to a contacting element 51 which is adapted to move between two normally open switches 52 and 53 which have cooperating pieces for the element 51. Switches 52 and 53 may be of the snap, micro switch type and are closed when the moving contact 51 engages either one of the respective cooperating pieces of the same. Independent circuits containing the respective normally open switches 52 and 53 also include, in the present instance, limit switches 54 and 55 which are of the slide contact type. As shown, the normally closed switch 55 is in series with the switch 53 and switch 54 is likewise situated in a separate circuit which includes switch 52. The slide pieces of the respective normally closed switches 54 and 55 are moved by a worm gear 56, shaft 57, and pinion 58 which last named pinion is driven directly from the drum 17 by way of shaft 59 and internal pinion 60. Consequently, the movement of trim tab surface 12 is confined within predetermined limits by the switches 54 and 55 which operate to open either of the desired controlling circuits when the designed limits of travel of the surface are exceeded. A relay indicated at 61 which is controlled by the individual switch including circuits described is included in a normally open circuit for controlling the direction of operation of the reversible motor 16. The motor circuit is separately energized, in the present instance, by a suitable source 62. Also, the relay 61 includes, as shown, a double pole switch 63 which is operated under control of solenoid coils 64 or 65 provided in the respective switch including circuits hereinbefore described. It will be now understood that motor 16 will rotate in one direction upon closure of switch 53 by contact 51 and will rotate in the opposite direction when switch 52 has been closed. Such movement may continue as long as the controlling circuits remain closed. As shown, the movement of motor 16 is transferred to the drum 17 by way of shaft 66 through a slip clutch connection indicated at 67, a releasable clutch connection 68, and shaft 69. The speed of trim tab controlling motor 16 is adjusted so the movement of trim tab 12 is slow when compared relatively with motion of the main control surface 10 effected by means of the primary servo motor pistons 43. Hence the trim tab does not interfere with the main servo motor response and essentially integrates the pressure variations occurring in the cylinder of the same. A solenoid controlled toggle mechanism may be employed, as shown, to effect engagement of the clutch connection 68 when automatic trim tab control is desired. A switch 70 operable by the pilot may be employed in a separate solenoid including circuit for engaging or disengaging the clutch 68. It will be understood that as long as clutch 68 is disengaged, no movement of motor 16 will be transmitted to control drum 17 so that the automatic trim tab control is ineffective while the automatic pilot is functioning normally. Also, in such event, control over the trim tab surface 12 is then capable of being manually effected by the human pilot.

Figure 3:
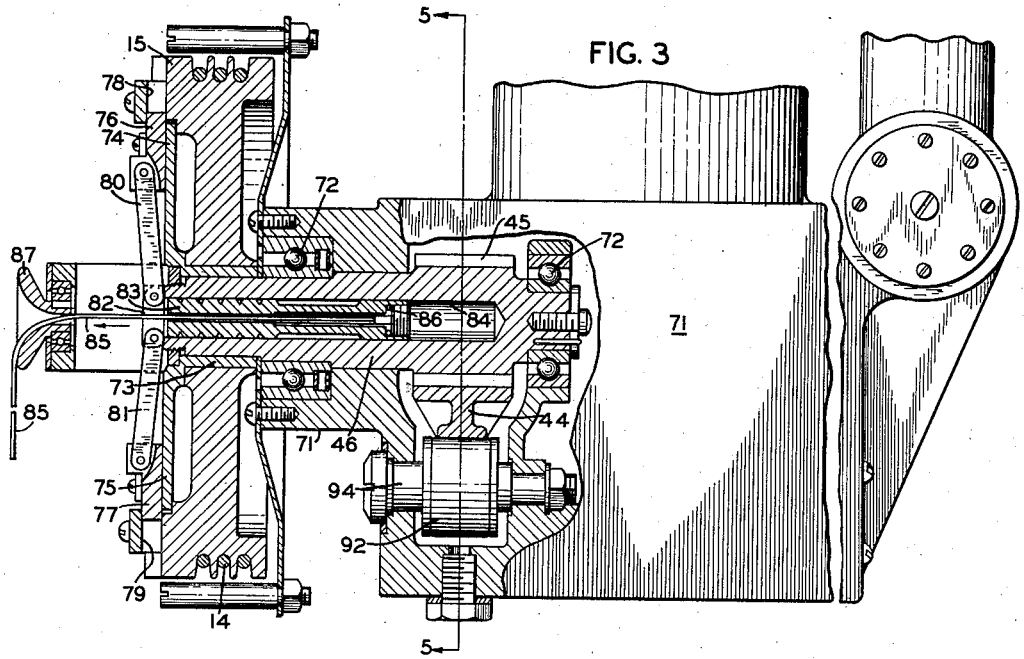
Fig. 3 is a side elevation showing the general casing construction of the improved servo motor unit, the cable drum structure and the driving and releasing mechanism for the same being illustrated in vertical section.
Figure 4:
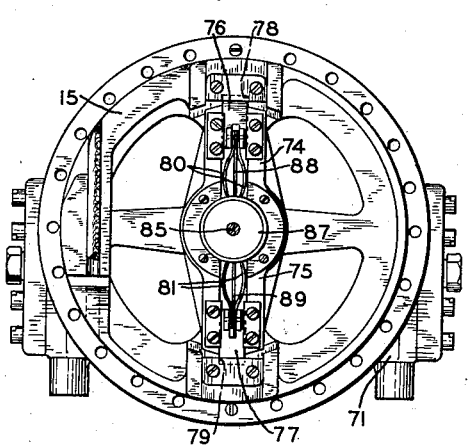
Fig. 4 is a detail front elevation, slightly reduced in size, showing the cable drum and releasing mechanism.
Figure 5:
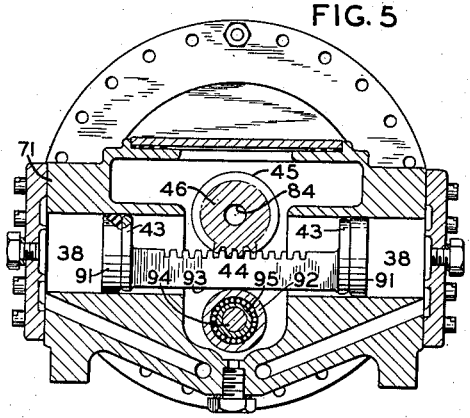
Fig. 5 is a section view taken on line 5—5, in Fig. 3.
Figure 6:
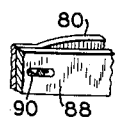
Fig. 6 is a detail perspective view illustrating the slot in the central connecting arm of the cable drum release mechanism.

With reference to the detail views, Figs. 4 to 6, inclusive, the casing of the main servo unit is indicated at 71. The pinion-driven shaft 46 is rotatably mounted by means of the spaced roller bearings 72 in the casing 71. Shaft 46 projects from the casing and cable drum 15 which is normally secured thereto transmits the movement of the rack 44 of the primary servo motor to the main control surface 10 of the aircraft. In accordance with the teaching of the present invention, an emergency release device is provided for freeing the drum 15 from its driving shaft 46 in order to disable the automatic pilot when required. The structural arrangements employed for this purpose include a sleeve 73 which is fixed in position on the shaft. The cable drum 15 is, in this instance, freely mounted on the sleeve 73 which may be considered as part of the driving shaft 46. Two oppositely disposed, radially extending arms 74 and 75 are situated on the projecting end of the sleeve 73. The respective ends of the arms 74 and 75 are grooved radially to slidably receive dogs 76 and 77. Two mating slots 78 and 79 are provided in the periphery of the drum 15 to receive the dogs 76 and 77. When so received or engaged, dogs 76 and 77 provide a means for locking the drum and shaft in motion communicating relation. Means for releasing the locking dogs is provided by two pairs of spring links as indicated at 80 and 81. Links 80 are pivotally connected to dog 76 and to a slide block 82 while links 81 similarly join the dog 77 to the block. Block 82 is further positioned for movement axially of the shaft 46 and such movement is imparted to the same in one direction by means of a keyed rod 83 which fits in a central splined bore 84 in the shaft 46. Rod 83 can be urged in the direction shown by the arrow in Fig. 3 by means of a release cable 85, which extend through a central opening in the block 82 and rod 83 and is rotatably retained at one end thereof within the rod 83 by an end bearing 86. The cable 85 is consequently positioned to be twist free within the rotatably movable shaft 46. Cable 85 extends through a rotatably mounted bell-shaped piece 87 situated in spaced axial relation to the shaft 46 on forwardly projecting portions of the sleeve 73. The cable 85 may be actuated by the human pilot through any suitable connection (not shown) in order to release the drum 15 from shaft 46 to disable the automatic pilot under emergency conditions. The lengths of the pairs of spring links are so designed that a force is applied by the same to keep the dogs 76 and 77 in normal locking position between the parts when the block is pressed inwardly through dead center to a stop position in which the block engages the end of shaft 46 as shown in Fig. 3. Springs 80 and 81 consequently form a toggle connection which normally tends to maintain the dogs in a locked position. A solid link 88 and 89 which is slotted at one end as indicated at 90, in Fig. 6, is situated between the respective pairs of spring links so that a positive movement of the toggle connection is obtained when the pivot pin is brought into engagement with either end of the slot. When the cable 85 is pulled by the pilot or otherwise actuated, the block 82 is forced to move in the direction of the arrow by the rod 83. The spring links of the toggle connection compress until a dead center position is reached after which the same expand to the limit permitted by the solid links 88 and 89 which are then effective to slide the dogs 76 and 77 from the slots in the drum. The cable drum is consequently freed from the automatic pilot and the controls of the aircraft restored so as to be fully responsive to the human pilot.

In the improved servo unit, the differential pistons 43 which move axially within the cylinder 38 are also capable of transverse adjustment with relation to the cylinder. As shown in Fig. 5, cup-shaped leather piston forming members, as indicated at 91, are fixed to the smaller diameter metal pistons 43 which are connected by the rack 44. With this construction the piston element is movable transversely of the cylinder and the piston may tilt in the cylinder under load conditions. In order to obviate the possibility of such an occurrence, the pitch line of rack 44 and the center of pressure of the pinion 45 are made coincident by means of an adjustable bearing 92 which is approximately placed on the same center line as the pinion in a position to take the downward thrust of the same due to loading. The pinion 45 which meshes with rack 44 is transversely centered with relation to the servo cylinder. The roller bearing 92, in this instance, is similarly centered and contacts the smooth surface 93 of the rack opposite to the toothed surface of the same. The bearing 92 centers the pistons in transverse relation in the cylinder by setting a rotatable member 94 which includes an eccentric portion 95 on which the provided roller bearing 92 rotates. The eccentrically positioned bearing 92 and member 94 consequently provide a means for adjusting the differential piston in desired transverse relation within the cylinder.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described our invention, what we claim and desire to secure by Letters Patent is:

1. In automatic pilots for aircraft having a control surface, a primary servo motor, a cable connection linking the surface and servo motor, a driving shaft controlled by the servo motor, a sleeve fixed to the shaft having radially extending arms, a cable drum freely mounted on said sleeve, a radially slidable dog engaged in contiguously positioned slots in said arms and said drum for normally locking said drum and shaft in motion communicating relation, yielding means for normally maintaining said dog in a locking position, and means for releasing said yielding means and sliding said dog from a locking position to free the drum from motion communicating relation to the driving shaft.

2. In automatic pilots for aircraft having a control surface, a primary servo motor, a cable connection linking the surface and servo motor, a driving shaft controlled by the servo motor, a sleeve fixed to the shaft having radially extending arms, a cable drum freely mounted on said sleeve, a radially slidable dog engaged in contiguously positioned slots in said arms and said drum for normally locking said drum and shaft in motion communicating relation, a slide block positioned for axial movement with respect to said shaft, a toggle connection between said block and dog normally positioned to maintain said dog in a locking position, and means for moving said block to release said dog and free the drum from motion communicating relation to the driving shaft.

GERALD N. HANSON.
PERCY HALPERT.
CARL A. FRISCHE.